Nov. 15, 1966  J. G. McKELVEY, JR., ET AL  3,285,421
MEMBRANE SUPPORT
Filed Nov. 22, 1963  2 Sheets-Sheet 1
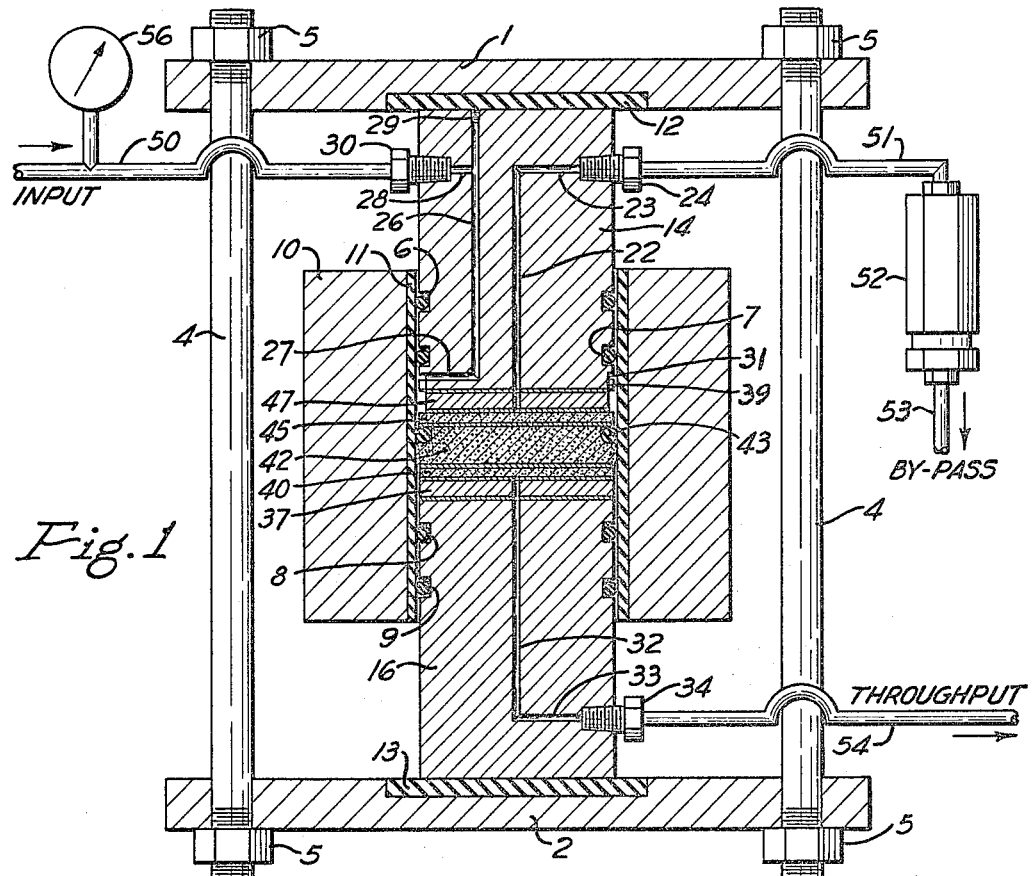
Fig. 1
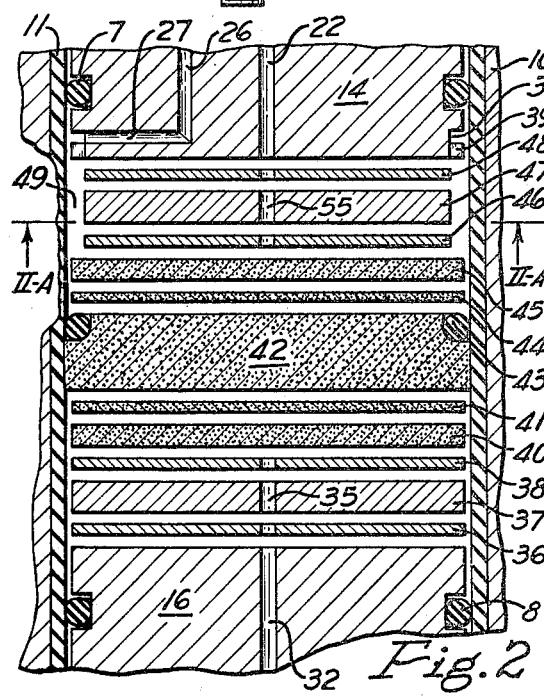
Fig. 2
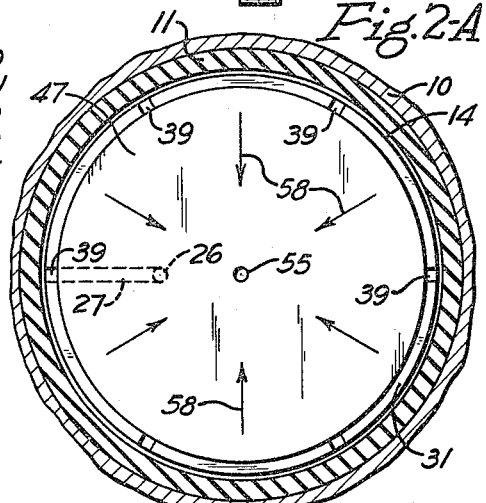
Fig. 2-A
INVENTORS.
JAMES G. McKELVEY, JR.
IVAN H. MILNE
ROBERT P. TRUMP
BY
ATTORNEY.

Nov. 15, 1966  J. G. McKELVEY, JR., ET AL  3,285,421
MEMBRANE SUPPORT
Filed Nov. 22, 1963  2 Sheets-Sheet 2
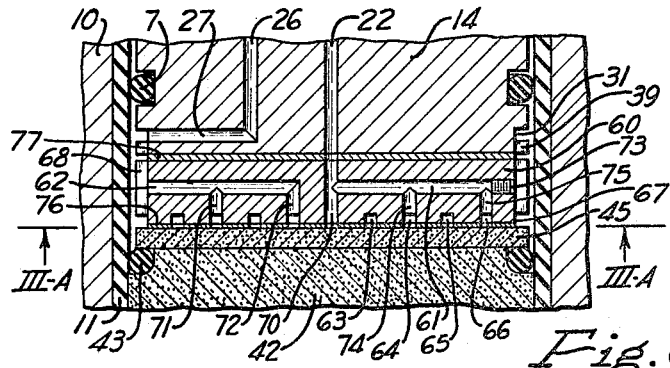
Fig. 3
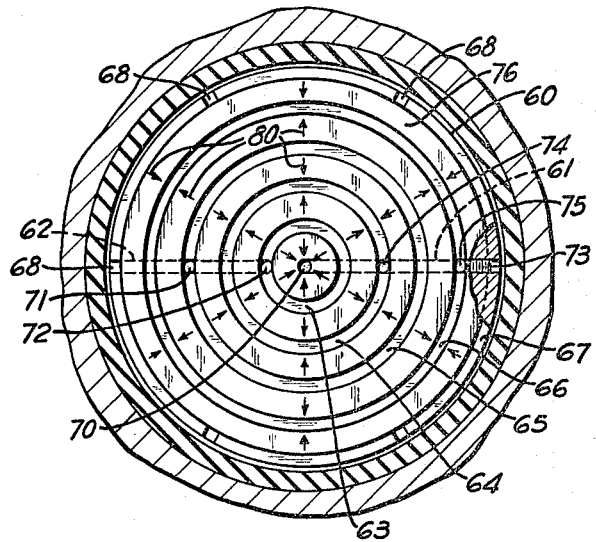
Fig. 3-A
INVENTORS.
JAMES G. McKELVEY, JR.
IVAN H. MILNE
BY ROBERT P. TRUMP
ATTORNEY.

United States Patent Office 3,285,421
Patented Nov. 15, 1966

3,285,421
MEMBRANE SUPPORT
James G. McKelvey, Jr., West Deer Township, Allegheny County, Ivan H. Milne, Monroeville, and Robert P. Trump, Middlesex Township, Butler County, Pa., assignors to Gulf Research & Development Company, Pittsburgh, Pa., a corporation of Delaware
Filed Nov. 22, 1963, Ser. No. 325,615
9 Claims. (Cl. 210—409)

This invention relates to ultrafiltration apparatus and in particular pertains to a support structure for an ultrafiltration membrane and which structure permits substantially complete flushing of all parts of the input surface of the membrane.

Ultrafiltratioin is a term applied to the filtering of dissolved substances from a solvent. It is known that certain types of membrane materials have the ability to permit flow therethrough of solvent under pressure while preventing flow of certain dissolved substances. One example of such a process is the removal of salts from sea water by filtration through a membrane under high pressure. The phenomenon has been duplicated in the laboratory by various workers, and other examples of ultrafiltration have also been reported in the literature.

In an ultrafiltration process the filtration efficiency is known to depend on the solute concentration at the input face of the membrane, and if this concentration is permitted to build up, the output filtrate will no longer be free of solute. Accordingly, it is important to flush the input face of the filter medium (usually called a "membrane" from analogy to a semi-permeable membrane used, for example, in dialysis) with the liquid being filtered in order to prevent the filtered-out solute from building up to to high concentration and thereby hindering the ultrafiltration action. This flushing action must be accomplished under the conditions of high pressure that exist at the input face of the membrane and under any compaction pressure required to maintain the effectiveness of the membrane.

A further difficulty arises because the membranes employed in ultrafiltration processes are very friable and require support against the stresses imposed by the high pressure required to effect ultrafiltration. It is well known that clay membranes, for example, require support both on the input side and especially on the output side in order to avoid cracks which allow unfiltered solution to pass through. It has also been found necessary to maintain a high compaction pressure on the clay in order to attain high filtration efficiency. The necessity of simultaneously maintaining the high compaction pressure and of supporting the filtration pressure stresses that accompany the ultrafiltration operation poses a mechanical difficulty in performing the necessary flushing of the input side of the membrane. This difficulty has in the past not been satisfactorily solved in that regions on the input side of the membrane which are not completely flushed permit a local increase in solute concentration that results in incomplete filtration at these regions of the membrane, whereupon the filtered solvent is left with some solute thus reducing the filtration efficiency.

It is an object of this invention to provide a support structure for an ultrafiltration membrane that permits maintaining a high compaction pressure and a high filtration pressure on the input side of the membrane while simultaneously flushing all portions of the input surface of the membrane to a substantially equal degree, whereby maximum filtration efficiency is attained.

It is another object of this invention to provide an ultrafiltration apparatus which permits substantially uniformly flushing the entire input surface of the ultrafiltration membrane while simultaneously maintaining the membrane under high compaction pressure and high filtration input pressure.

These and other useful objects of this invention are attained by the apparatus described in this specification of which the accompanying drawings form a part, and in which:

FIGURE 1 is a diagrammatical cross section illustrating one embodiment of the invention;
FIGURE 2 is an exploded cross section showing details of the embodiment of FIGURE 1;
FIGURE 2A is a plan view of the input-fluid-distributing disk of FIGURE 2;
FIGURE 3 is a cross section illustrating another embodiment of the invention; and
FIGURE 3A is a plan view of the input-fluid-distributing disk of FIGURE 3.

The invention will be described as applied by way of example to the ultrafiltration of an aqueous sodium chloride solution through a bentonite clay membrane to remove sodium chloride. As will become evident, the invention does not reside in the composition of the membrane or in the particular solution to be filtered, but pertains to the flushing of the input face of any membrane that requires high compaction pressure and simultaneous mechanical support against the required filtration pressure. A bentonite membrane, comprising, for example, a pad of compacted commercial aqua-gel, can be thought of as a cation-exchange membrane with extremely small pores. If an attempt is made to drive a salt solution (say sodium chloride) through such a membrane, the negatively charged chloride ions cannot pass into the narrow separation afforded by the negatively charged surfaces or edges of the clay platelets. In turn, the sodium ions, although they can enter, are restricted in order to maintain an electrical balance. Thus, a pressure drive of aqueous sodium chloride solution through such a membrane produces what can be described as an electro-mechanical sieving of the salt solution. The phenomenon is called ultrafiltration. Due to the fact that the filtering process is concentration dependent, it is necessary to remove the rejected salt from the input face of the clay pad. This is accomplished by flushing the face with the input solution. There is no deterioration of this type of membrane with use.

In this invention the input surface of the supported membrane is provided with a mechanically competent porous member through which the input solution is applied to the membrane under the appropriate ultrafiltration pressure. Compaction pressure is applied to the membrane by a piston on the side of the porous member opposite to that which contacts the membrane. Provision is made to flush the input surface of the membrane with input solution. In this invention the flushing action is accomplished by providing in or contiguous to the porous member on the input side of the membrane at least two unconnected spatial regions, and flowing the input solution from one such region to the other through the intervening porous member, all under the ambient ultrafiltration input pressure. The two regions are disposed so that the flow path from one region to the other via the porous member is of substantially the same length for all parts of these regions and so that such flow paths flush substantially uniformly all portions of the porous member. In this manner all portions of the input surface of the membrane are flushed to a substantially equal degree, thus maintaining a minimum concentration of solute at all portions of the input surface of the membrane. There are, therefore, no regions on the input side of the membrane at which the solute concentration can build up to a value that is detrimental to the purity of the filtered solvent. This results in producing maximum filtration efficiency for the membrane as a whole. In a specific embodiment of the invention a substantially radial flow of flushing solution through the porous member on the input side of the membrane is employed for a circular disk-shaped pad or membrane.

Referring to FIGURE 1 there is illustrated in cross section a typical ultrafiltration cell arrangement to which this invention is applied. The cell comprises a compression frame made up of rigid steel end plates 1 and 2 held together by a plurality of bolts 4 having nuts 5 at both ends as shown. The membrane 42 is enclosed in an outer steel cylinder 10 of sufficient strength to withstand the ultrafiltration pressure as well as the required compaction pressure applied by the compression frame. The invention will be described as applied to an ultrafiltration membrane made of bentonite clay, e.g. commercial aqua-gel, which requires a compaction pressure in the order of 10,000 p.s.i. The cylinder 10 is preferably lined with a nylon cylinder liner 11 that is fitted with two opposing steel pistons 14 and 16. Pistons 14 and 16 are provided with a plurality of ring grooves having rubber O-rings such as 6, 7, 8, and 9, as is conventional in pistons adapted for high-pressure operation. Electrically insulating pads 12 and 13 are placed between each piston and the respective end plates 1 and 2. Although two pistons 14 and 16 are shown, it will be apparent that either piston may be replaced by a cylinder head if desired. By tightening the nuts 5 the required compaction pressure may be applied to the membrane 42 located in the cylinder 10 between the pistons 14 and 16. It is convenient to employ two pistons and a floating cylinder 10 as shown because this simplifies the mechanical construction and provides for easy disassembly. The nylon cylinder liner 11 and the pads 12 and 13 are for the purpose of electrically insulating the pistons 14 and 16 in order to control any electro-filtration effects which may develop under certain conditions. While nylon is preferred for the cylinder liner 11 and phenolic resin is preferred for pads 12 and 13, it is apparent that any mechanically competent electrically non-conducting material may be used for elements 11, 12, and 13.

The piston 14 is provided with an axial hole 22 connecting with a horizontal hole 23 which terminates at the outer surface of piston 14 in a pressure fitting 24. The piston 14 is also provided with a longitudinal hole 26 whose upper end is plugged at 29, but which communicates with a horizontal hole 28 that terminates at the outer surface of piston 14 in a pressure fitting 30. The lower end of hole 26 communicates with another horizontal hole 27 that terminates in a circumferential groove 31 in the outer surface of the piston 14 between the lowermost O-ring 7 and the bottom end of piston 14. A plurality of short longitudinal grooves 39, six of which are best seen in FIGURE 2A, permit escape of input fluid from hole 27 and groove 31 to the bottom end of piston 14. Alternatively, the diameter of piston 14 may be slightly reduced in the region between the groove 31 and the end of the piston 14 so as to allow fluid from hole 27 and groove 31 to flow around the outside of piston 14 and reach the end thereof. The lower piston 16 is provided with an axial hole 32 that connects with a horizontal hole 33 terminating at the outer surface of piston 16 in pressure fitting 34. The membrane 42 to be described is located between the pistons 14 and 16 and by means of a pump (not shown) the input solution to be filtered as supplied under pressure to the top of the membrane through the pressure fittings 30 and 24 in a manner to be described. After passing through the membrane 42, the filtrate discharges through the lower piston at pressure fitting 34.

FIGURE 2 is an exploded view showing in detail the assembly between the pistons 14 and 16 of FIGURE 1, the respective elements being shown separated only for the purpose of clarity, it being understood that the parts will normally be tightly clamped together by the compaction pressure applied through tightening nuts 5 of FIGURE 1. Starting at the top of cylinder 16 there is provided a lead-foil washer 36 having a central hole in registry with the hole 32 in piston 16. The outside diameter of washer 36 is somewhat less than the inside diameter of cylinder liner 11. Above the washer 36 is a support disk 37 having a central hole 35 in registry with the hole 32. Above the disk 37 is a second lead-foil washer 38 similar in all respects to washer 36. The lead-foil washers 36 and 38 may be of the order of .002 inch thick. The purpose of disk 37 is merely to provide a conveniently replaceable end piece for piston 16 so that any mechanical damage to the end of the piston may be corrected by simply replacing disk 37 without necessitating replacement of the entire piston 16. Above the washer 38 is placed a porous disk 40 made, for example, of sintered monel metal. On top of the porous disk 40 there may be placed a piece of ordinary thin filter paper 41 which serves to cushion the membrane 42 placed thereon and permits the membrane material to be easily separated from porous disk 40 whenever the apparatus is disassembled, although the filter paper 41 is not essential to the invention.

The membrane 42 is placed or formed in situ on top of the porous disk 40, or the overlying filter paper 41 if such is employed. A clay membrane is preferably formed in situ by placing in the cylinder on the filter paper 41 the required amount of bentonite, such as commercial powdered aqua-gel. An O-ring 43 is placed in the position shown around the periphery of the clay against the cylinder liner 11. The bentonite has sufficient fluidity so that after assembly when the membrane 42 is placed under compaction by tightening nuts 5 of FIGURE 1, the O-ring 43 will be forced outward into good sealing engagement with the interior wall of the cylinder liner 11. It is preferable that the O-ring 43 be placed at the input (upper) side of the membrane pad. The purpose of O-ring 43 is to prevent input solution from bypassing around the outer edge of the membrane 42 and also to prevent forcing the membrane material into the small clearance around the porous disk 45 when compaction pressure is applied to the membrane. On top of the membrane 42 there may be placed another thin sheet of filter paper 44 whose purpose is to facilitate separation of the membrane material from the overlying porous disk 45 upon disassembly of the apparatus. The diameter of porous disk 45 as well as that of porous disk 40 previously mentioned is substantially the same as the inside diameter of the cylinder liner 11. On top of the porous disk 45 is placed a lead-foil washer 46 having an axial opening and similar to washers 36 and 38. A support disk 47 which in some embodiments also serves as an input-fluid-distributing disk is placed on top of the lead-foil washer 46 and the disk 47 has a special configuration to be described later. On top of the support disk 47 is placed another lead-foil washer 48 with a central hole, and this is followed by piston 14. The purpose of lead foil washers 46 and 48 is to provide a fluid seal between the elements 45 and 47, and 47 and 14 respectively. By tightening the nuts 5 on the compression frame the bentonite pad 42 is placed under compaction pressure of something in the order of 10,000 p.s.i.

In the embodiment illustrated in FIGURES 2 and 2A the support disk 47 is slightly smaller in outside diameter than the inside diameter of the cylinder liner 11 so as to provide a substantially uniform clearance 49 for longitudinal flow past the outer edge of disk 47. The disk 47 also has a central hole 55 in registry with the hole 22 of piston 14. In another embodiment this disk has a different configuration to be described later. The input solution under the appropriate filtration pressure is applied at pressure fitting 30 (FIGURE 1) and flows via holes 28, 26, and 27, grooves 31 and 39, clearance 49 to the outside edge of porous disk 45. Flow resistance through the porous disk 45 is very low, i.e. substantially nil, compared to the flow resistance of the membrane 42, and the porous disk 44 thus allows the input solution access to the upper side of the membrane, 42. Solute is retained on the upper, i.e. input, side of the membrane 42 and the solvent filters through the membrane 42. Filtered solvent emerging from the lower side of membrane 42 flows into the porous disk 40, the throughput being discharged through the holes 32 and 33. Inasmuch as flow resistance through the porous disk 40 is substantially nil as compared to flow resistance through the membrane 42, the porous disk 40 acts as a gathering means to collect the filtered solvent emerging from the lower, i.e. output, side of the membrane 42.

The central hole 22 in the (upper) piston 14 permits a fraction of the input solution from pipe 50 to flow radially through and toward the center of porous disk 45, whence this portion of the input solution flows through holes 22 and 23, pressure fitting 24, pipe 51 to a flow resistance 52, from whose discharge line 53 this solution (which bypasses the membrane) is discarded, or if it is of intrinsic value it may be returned to the input supply. The input solution which thus bypasses the membrane is, of course, not filtered of solute but serves to sweep away from the upper, i.e. input, side of the membrane 42 the solute filtered out of that part of the solution that passes through the membrane, and thereby prevents solute concentration from building up on the input surface of the membrane 42.

The ultrafiltration pressure may be in the order of from 2,000 to 10,000 p.s.i. in order to produce a reasonable throughput to discharge line 54 when filtering aqueous 1.0 N. sodium-chloride solution through clay. A pressure gauge 56 indicates the input pressure, i.e. the ultrafiltration pressure. It is apparent that there will be a slight variation in filtration pressure across the top of the membrane 42 due to flow radially inward through the porous disk 44, but this pressure variation is infinitesimal compared to ultrafiltration pressures normally employed. Inasmuch as the volumetric flow rates employed are small, the flow channels such as holes 22, 26, and 27, grooves 31 and 39, clearance 49 are small compared to the diameter of pistons 14 and 16, and offer substantially no resistance to flow as compared to the resistance offered by membrane 42 and the flow restriction 52.

The input solution which bypasses the membrane 42 by flowing radially inward from the outer periphery of porous disk 45 to its center and out through hole 22 serves to flush the upper surface of the membrane 42 and prevents the accumulation of filtered-out solute on the input surface of the membrane. The filter paper 44 if employed does not interfere with the flushing action and functions as part of the porous disk 45. The flow resistance 52 is constructed so as to restrict the bypass flow to provide an adequate volume of flushing solution to avoid the accumulation of any solute on the input surface of the membrane 42. The arrows 58 shown in FIGURE 2A illustrate the radial direction of flow of the flushing solution from the outer periphery of the porous disk 45 to the center hole 22 as the input solution traverses the porous disk 45. It is apparent that filtered solution that passes downward through the membrane 42 loses solute, while the rest of the input solution flushes inward toward hole 22 and on the way picks up solute left on the input surface of the membrane 42, and eventually discharges through the hole 22. Accordingly, the solution that discharges at bypass line 53 will have a higher concentration of solute than the input solution injected at line 50 to the extent that the membrane throughput at 54 has been depleted of solute.

The embodiment of FIGURES 2 and 2A illustrates an important feature of this invention in that the flow resistance encountered by the flushing solution in flowing from the outer periphery of the porous disk 45 to the center hole 22 is the same for all flow paths. This provides for complete and uniform flushing of the filtered-out solute from the upper surface of the membrane. It is apparent that the entire upper surface of the membrane is subjected to the ultrafiltration pressure indicated by gauge 56 while the flushing action takes place. It is further apparent that the inward radial flow of flushing fluid is decreased by the fluid that passes downward through the membrane, but that the flow density of flushing fluid increases toward the center because of the radial convergence of the flow lines as indicated by arrows 58. In any particular ultrafiltration cell the flow restrictions 52 is adjusted to allow sufficient flow to effect substantially complete flushing where there is minimum flow density of flushing fluid, i.e. around the outer edge of disk 45, whereupon all other portions of the input surface of the membrane will be even more effectively flushed. It is apparent that the radial flushing flow pattern will provide complete flushing over the entire input area of the membrane leaving no unflushed areas. The invention thus provides that every flow path through the porous disk 45 has the same flow resistance, thus eliminating all possibility of the existence of dead or unflushed regions.

FIGURES 3 and 3A show in cross section and plan another embodiment of the invention. In this embodiment the support disk 60 is substantially thicker than disk 47 of FIGURE 2 in order that it may be drilled for internal radial holes 61 and 62. The disk 60 may have an outside diameter that is substantially the same as the inside diameter of the cylinder liner 11 with only a small amount of clearance. The filter paper 44, being very thin, is not shown in FIGURE 3, but may be employed in a manner similar to that of FIGURE 2. The face of support disk 60 facing the porous disk 45 is provided with a plurality of concentric grooves, as 63, 64, 65, 66, and 67. The outermost groove 67 is at the outside edge of the disk 60, and is provided with a plurality of intersecting longitudinal grooves 68. In assembly the grooves 68 are placed in registry with the similar grooves 39 in piston 14. Alternative to the grooves 67 and 68 the disk 60 may have a slightly smaller outside diameter to provide clearance similar to 49 of FIGURE 2. The disk 60 has a axial hole 70 that is in registry with hole 22 of piston 14. The lead-foil washers 70 and 77 also have registering central holes. A hole 62 is drilled radially inward from one of the grooves 68 substantially halfway between the two faces of disk 60, but the hole 62 does not reach the axial hole 70. Short holes 71 and 72 are drilled from the grooves 63 and 65 to intersect the hole 62. Thus input solution is given access to a plurality of concentric annular regions of the porous disk 45 contiguous to the concentric grooves 63, 65, and 67. A hole 61 is drilled from the outside edge of the disk 60 to communicate with the axial hole 70, and the outside end of hole 62 is tightly sealed by a plug 73. Short holes 74 and 75 are drilled from the alternate grooves 64 and 66 to intersect hole 61. In this manner the alternate grooves 64 and 66, as well as center hole 70 are interconnected and form a collection system for flushing solution. It is apparent that input solution will pass through the porous disk 45 after entering through grooves 63, 65, and 67 and discharging through grooves 64, 66, and hole 70. The lead-foil washer 76 that is located between the porous disk 45 and the disk 60 has annular rings cut out of it so that the grooves 63, 64, 65, 66, and 67 are in communication with the top surface of porous disk 45. These rings are easily cut out of the washer 76 by means of a circle cutter or safety-razor blade as the lead-foil tends to cling to the porous disk 45 when the lead-foil is placed between the disks 45 and 60 and moderate pressure applied. When using this embodiment of FIGURES 3 and 3A, all other parts of the ultrafiltration cell and system are the same as shown in FIGURE 1.

The arrows 80 shown in FIGURE 3A illustrate the flow of flushing fluid between the respective sets of grooves. It is seen that every flow path radially through the porous disk 45 is of the same length for every annular flow regime so that every flow path from any one groove to the next juxtaposed groove will have substantially the same flow resistance. Thus there will be no dead spots on the input surface of the membrane. While the grooves 63–67 are shown in FIGURES 3 and 3A to be substantially equidistantly spaced, it is apparent that the spacings may be decreased slightly toward the center to compensate for increased flow resistance toward the center, particularly in the innermost flow regime which exits into hole 70. It is apparent that in none of the annular flow regimes between any of the grooves is there any dead area where effective flushing does not occur. Furthermore since the flow resistance of each flow path from one groove to the adjacent groove is substantially the same, there will be substantially the same degree of flushing in every azimuthal direction about the center of the input surface of membrane 42.

In the figures the thickness of the porous disks 45 and 60 are exaggerated for purposes of clarity of illustration, as is also the radial width of the respective grooves in disk 60. In any practical ultrafiltration cell the porous disk 45 would be relatively thin and the grooves in disk 60 would be relatively narrow so that the respective grooves will function substantially as line sources and sinks in a thin flow sheet (i.e. porous disk 45), with the line source and sink having a configuration such that all flow paths from the source to the adjacent sink are of equal length, whereby the solution flow flushes all parts of the porous sheet and correspondingly flushes all parts of the input surface of membrane 42. While a circular configuratiton has been illustrated, it is apparent that for a large membrane alternate parallel straight line sources and sinks for flushing solution may be employed.

What we claim as our invention is:

1. Apparatus for flushing the input surface of an ultrafiltration membrane to which input solution is applied under pressure which comprises
    a porous member contacting the input surface of the membrane,
    means providing solution access other than by communication through any portion of said porous member to at least two non-intersecting regions located on the same side of said porous member, one of said regions having a plurality of points,
    means flowing input solution from one of said regions through said porous member to the other of said regions, and
    said regions being located so as to provide a substantially equal minimum length flow path from substantially every point of one of said regions through said porous member to the other of said regions.

2. The apparatus of claim 1 wherein one of said regions has a substantially circular internal boundary and the other of said regions has a substantially circular external boundary concentric with said internal boundary.

3. The apparatus of claim 1 wherein said regions have the form of concentric annuli.

4. Apparatus for flushing the input surface of an ultrafiltration membrane to which input solution is applied under pressure which comprises
    a porous member having two substantially parallel sides one of which is in contact with the input surface of the membrane,
    a non-porous member having a surface in contact with the other side of said porous member,
    two non-intersecting recesses in said contact surface of said non-porous member,
    said recesses being located to provide a substantially equal minimum length flow path from substantially every point of one of said recesses through said porous member to the other of said recesses, and
    means flowing input solution from one of said recesses of said non-porous member through said porous member to the other of said recesses of said non-porous member.

5. The apparatus of claim 4 wherein one of said recesses has a substantially circular internal boundary and the other of said recesses has a substantially circular external boundary concentric with said internal boundary.

6. The apparatus of claim 4 wherein said recesses have the form of concentric annuli.

7. Apparatus for flushing the input surface of a substantially circular ultrafiltration membrane to which input solution is applied under pressure which comprises
    a substantially circular porous member having substantially parallel sides one of which is in contact with substantially the entire input surface of the membrane,
    means providing input solution access to the outer edge of said porous member other than by communication through any portion of said porous member,
    means providing flushing solution access to substantially the center of said porous member on the same side thereof as the input solution means other than by communication through any portion of said porous member, and
    means flowing input solution from the edge of said porous member through said porous member to the center of said porous member.

8. Apparatus for flushing the input surface of a substantially circular ultrafiltration membrane to which input solution is applied under pressure which comprises
    a substantially circular porous member having substantially parallel sides one of which is in contact with substantially the entire input surface of the membrane,
    a substantially circular non-porous member having a surface in contact with substantially the entire other side of said porous member,
    a groove in the contact surface of said non-porous member,
    a hole in the center of said non-porous member, said groove being concentric to said hole, and
    means flowing input solution from said groove of said non-porous member through said porous member to said hole in said non-porous member.

9. Apparatus for flushing the input surface of a substantially circular ultrafiltration membrane to which input solution is applied under pressure which comprises
    a substantially circular porous member having substantially parallel sides one of which is in contact with substantially the entire input surface of the membrane,
    a substantially circular non-porous member having a surface in contact with substantially the entire other side of said porous member,
    two groups of alternating concentric grooves in the contact surface of said non-porous member, and
    means flowing input solution from one of said groups of grooves through said porous member to the other of said groups of grooves.

References Cited by the Examiner

UNITED STATES PATENTS

| | | | |
|---|---|---|---|
| 2,612,036 | 9/1952 | Angona | 210—446 X |
| 3,133,132 | 5/1964 | Loeb et al. | 264—49 |
| 3,173,868 | 3/1965 | Blomquist | 210—446 X |

SAMIH N. ZAHARNA, *Primary Examiner.*

REUBEN FRIEDMAN, *Examiner.*

F. A. SPEAR, *Assistant Examiner.*